(12) United States Patent
Dittmann

(10) Patent No.: US 6,687,367 B1
(45) Date of Patent: Feb. 3, 2004

(54) METHOD AND APPARATUS FOR THE SECURED PROVISION OF FUNCTIONS OF A SIGNALING NETWORK FOR DISTRIBUTED TELECOMMUNICATION APPLICATIONS

(75) Inventor: Werner Dittmann, Albaching (DE)

(73) Assignee: Siemens Aktiengesellschaft, Munich (DE)

(*) Notice: Subject to any disclaimer, the term of this patent is extended or adjusted under 35 U.S.C. 154(b) by 568 days.

(21) Appl. No.: 09/637,589

(22) Filed: Aug. 14, 2000

Related U.S. Application Data

(63) Continuation of application No. PCT/DE98/03342, filed on Nov. 13, 1998.

(51) Int. Cl.[7] .......................... H04M 7/00; H04M 3/00; H04M 5/00
(52) U.S. Cl. .................... 379/229; 379/221.08; 379/242
(58) Field of Search .................. 379/229, 230, 379/221.08–221.09, 221.1, 221.11, 221.12, 242, 201.12, 114.28, 114.29, 121.01, 126

(56) References Cited

U.S. PATENT DOCUMENTS

| 4,634,812 A | * | 1/1987 | Hornburger et al. | ........ 379/269 |
| 4,658,098 A | * | 4/1987 | Wegmann | ................. 379/112.1 |
| 5,325,419 A | | 6/1994 | Connolly et al. | ............ 455/435 |
| 5,655,007 A | | 8/1997 | McAllister | ................ 379/91.01 |
| 5,822,421 A | * | 10/1998 | Ryu | ............................ 379/225 |

OTHER PUBLICATIONS

Published International Application No. 96/25012 (Yates et al.), dated Aug. 15, 1996.
XP–002104730, "Strong Authentication in Intelligent Networks", Refik Molva et al., pp. 629–634.

* cited by examiner

Primary Examiner—Benny Tieu
(74) Attorney, Agent, or Firm—Laurence A. Greenberg; Werner H. Stemer; Ralph E. Locher

(57) ABSTRACT

A method and an apparatus are provided for the secured provision of functions of a signaling network for distributed telecommunication applications. An application logic of a telecommunication network is separated from system components that are relevant to security by setting up the former on decentralized apparatuses of the communication network and the latter on central apparatuses of the communication network. Suitable communication measures between central and decentralized apparatuses ensure that centrally available functions can be called from an application logic which is implemented in a decentralized manner. Security functions for protecting the signaling network and/or a central apparatus are set up or utilized on central apparatuses.

4 Claims, 1 Drawing Sheet

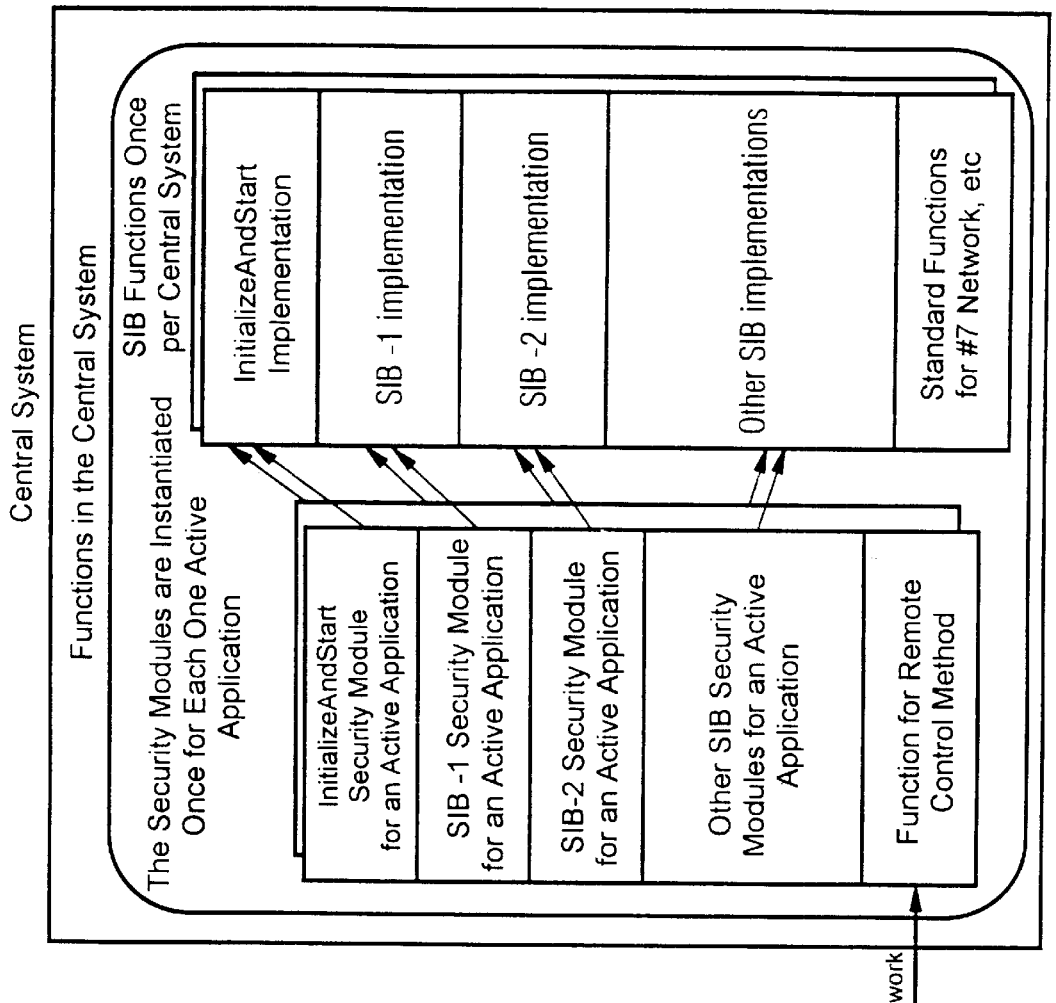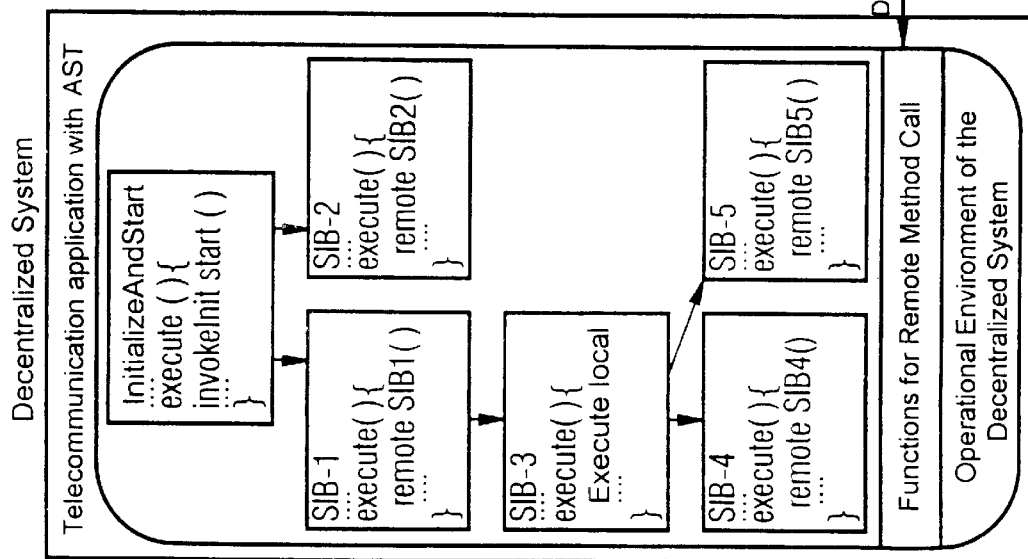

METHOD AND APPARATUS FOR THE SECURED PROVISION OF FUNCTIONS OF A SIGNALING NETWORK FOR DISTRIBUTED TELECOMMUNICATION APPLICATIONS

CROSS-REFERENCE TO RELATED APPLICATION

This application is a continuation of International Application No. PCT/DE98/03342, filed Nov. 13, 1998, which designated the United States.

BACKGROUND OF THE INVENTION

Field of the Invention

The invention relates to a method and an apparatus for the secured provision of functions of a signaling network for distributed telecommunication applications.

Many telecommunication applications require functions of a signaling network, and therefore nowadays are only realized on those systems which have a connection to such a signaling network. The most important signaling network used in practice is presumably the so-called #7 signaling network (which is also simply referred to below as a #7 network). Such systems with direct linking to a signaling network on which telecommunication applications are nowadays realized are digital switching centers (e.g. for ISDN Supplementary Services) or central apparatuses of an Intelligent Network (IN).

Distribution of such applications to apparatuses (systems) which have no direct connection to a signaling network is not offered nowadays. That known technology has both advantages and disadvantages. The most serious disadvantages are:

a) Functions in the switching centers are usually available only to the region covered by the switching, but not in the entire telecommunication network.

b) Switching centers cannot be easily extended by applications by third parties, since proprietary special systems are usually involved.

c) The few central IN systems which have to execute all of the applications (e.g. IN value-added services) require a high administration outlay, are bottlenecks when there is high traffic volume, and are highly critical with regard to their functional reliability.

d) All of the data of all of the IN applications are present on the central IN systems, even though many data are purely application-specific. That fact leads inter alia to the above-mentioned high administration outlay, and furthermore entails even further problems because that large stock of data has to be regularly secured and protected against unauthorized access.

Against those disadvantages, the known solutions have the following advantages:

a) The known solutions are based on a reliable and mature technology. That is a crucial factor for the operation of a telecommunication network.

b) All of the necessary functions for charge recording, billing, statistics and for fulfilling other legal stipulations are present and certified.

SUMMARY OF THE INVENTION

It is accordingly an object of the invention to provide a method and an apparatus for the secured provision of functions of a signaling network for distributed telecommunication applications, that provide an improvement to the known technology which overcomes the above-mentioned disadvantages and at the same time preserves the above-mentioned advantages of the heretofore-known methods and apparatuses of this general type.

With the foregoing and other objects in view there is provided, in accordance with the invention, a method for the secured provision of functions of a signaling network for distributed telecommunication applications, which comprises implementing or already having present an application logic on a decentralized apparatus of a communication network; setting up or utilizing functions on a central apparatus for linking to a signaling network; setting up or utilizing security functions on a central apparatus for protecting the signaling network and/or a central apparatus; and providing a communication device for communication between central and decentralized apparatuses to enable centrally available functions to be called from an application logic implemented in a decentralized manner.

In accordance with another mode of the invention, there is provided a method which further comprises setting up or utilizing service independent building blocks on a central apparatus.

In accordance with a further mode of the invention, there is provided a method which further comprises setting up or utilizing security-critical functions, such as functions for billing, functions for charge recording, functions for statistics or functions for fulfilling legal conditions, on a central apparatus.

With the objects of the invention in view, there is also provided, a decentralized apparatus of a communication network, comprising a device for implementing application logic; and a device for communicating with a central apparatus of a communication network to enable centrally available functions to be called from an application logic implemented in a decentralized manner.

With the objects of the invention in view, there is additionally provided, a central apparatus of a communication network, comprising functions for linking a communication network to a signaling network; security functions for protecting the signaling network; and a communication device for communicating with a decentralized apparatus to enable centrally available functions to be called from an application logic implemented in a decentralized manner.

In accordance with another feature of the invention, there is provided a device for setting up or utilizing service independent building blocks.

In accordance with a concomitant feature of the invention, there is provided a device for setting up or utilizing security-critical functions, such as functions for billing, functions for charge recording, functions for statistics or functions for fulfilling legal conditions.

The invention is accordingly based on the fundamental concept of separating the application logic of a telecommunication network from system components that are relevant to security by setting up the former on decentralized apparatuses of the communication network and the latter on central apparatuses of the communication network. In this case, suitable communication measures between central and decentralized apparatuses ensure that centrally available functions can be called from an application logic which is implemented in a decentralized manner. Security functions for protecting the signaling network and/or a central apparatus are set up or utilized on central apparatuses.

Other features which are considered as characteristic for the invention are set forth in the appended claims.

Although the invention is illustrated and described herein as embodied in a method and an apparatus for the secured provision of functions of a signaling network for distributed telecommunication applications, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIGURE of the drawing is a block diagram illustrating aspects, which are essential to the invention, of a functional division between decentralized and central apparatuses of a communication network according to the present invention.

DESCRIPTION OF THE PREFERRED EMBODIMENTS

Referring now in detail to the single FIGURE of the drawing, it is seen that the novel method uses a concept, which is already known in telecommunication applications, of a service independent building block (SIB) and extends it by a number of functions and concepts. One way in which it is extended is that the SIBs are regarded as general functional modules, and therefore their use is not restricted to IN services and IN systems.

An SIB is described by its external properties (e.g. operands, inputs and outputs) as well as by its behavior (the function).

SIBs provide basic functions of a signaling network for distributed applications, e.g.:

Connect (connection of a call)

Play Announcement

Release (release of a call)

This enumeration of applications is not complete, but rather is only by way of example. These basic SIBs conceal the complex control of the signaling network from the applications and guarantee protection of the signaling network against faulty control.

Further SIBs provide other generally required functions, e.g. for the evaluation of call numbers, distribution of calls according to specific criteria or for data management. These SIBs can be implemented either on the central or the decentralized system. This depends on the SIB function, e.g. an SIB which requires global network data should be implemented on the central system.

Different telecommunication applications can be realized by the appropriate combination of SIBs and the setting of SIB operands. The way in which the SIBs are combined and the way in which the operands are set is defined in the application logic. Nowadays, as mentioned, the SIBs and the required application logic are available only in the digital switching centers or the central IN.

A telecommunication application is implemented on a decentralized apparatus (decentralized system) of a communication network, which is illustrated schematically in the FIGURE, with the aid of software building blocks (ASTs) that describe the external behavior of service independent (software) building blocks (SIBs), i.e. e.g. the required operands and inputs and outputs. In addition, these software building blocks (ASTs) situated on the decentralized apparatus contain the execution method of the respective service independent building blocks. These service independent building blocks themselves are situated on a central apparatus. The decentralized apparatus illustrated in the FIGURE is representative of a possible multiplicity of such decentralized apparatuses. Likewise, in practice there will generally be a plurality of central apparatuses, and the central apparatus (central system) illustrated in the FIGURE is representative thereof.

As can be discerned from the FIGURE, the execution method provided in an AST building block is not always a local implementation of the function of a service independent building block (SIB function), but rather uses an interface or calling the SIB implementation on the central system (designated as "remote SIBx( )"). This special execution method in the AST conditions the necessary data for the SIB function, communicates the latter to the central system and initiates the actual execution of the SIB function there. After the SIB function has ended, the central system sends a return value to the calling method of the decentralized system. This value can now be evaluated and used for the further control of the distributed application.

The data and jobs of the decentralized system are firstly checked by the SIB security modules in the central system. It is only after successful checking that the data and the jobs are forwarded for actual processing. The SIB security modules provide the following functions and interfaces:

verification and security functions an interface to the corresponding functions of the decentralized system an interface to the SIB implementations of the decentralized system.

The SIB security modules required by the application are instantiated for each active distributed application during a logon phase and are initialized with verification and security rules applicable to the application. The implementations of the SIB functions themselves are present only once on the central system and are called by the application-specific security modules for execution of the SIB functions.

The sequence of events in a typical distributed application is generally subdivided into a plurality of phases:

1. A logon phase. This phase is represented by the SIB "initializeAndStart" in the FIGURE. In this phase, the decentralized system establishes the connection to the central system. The central system checks the authorizations of the decentralized system. After successful checking, the decentralized system logs on the desired application at the central system. In this case too, the central system verifies whether or not this application is permitted to be started and executed. If this checking also proceeds successfully, the central system instantiates the SIB security modules for this application, supplies them with the data for the verification and security rules and provides the resources which are necessary for the distributed application. The decentralized system receives the necessary information from the central system for being able to communicate with the SIB security modules. The logon phase is then concluded.

2. A working phase. This phase is represented by the SIBs disposed in a tree-like manner in the FIGURE. This phase executes the distributed application. Depending on the realization of the SIBS, the functions are executed on the decentralized system or, through the communication interface, on the central system.

3. A logoff phase. This is not specially represented in the FIGURE. The working phase is ended and the decentralized system logs off the distributed application at the central system. The resources provided on the central system are released.

The novel method separates the implementation and execution of the application logic from the implementation and execution of the SIBs. As a result, it is possible to distribute the telecommunication applications between a plurality of systems and thus reduce the load for the individual systems. The division of an application is effected according to the following technique:

A) the application logic and specific communication functions are implemented on the decentralized system. For the most part the application-specific data are also available on this system. This system does not require a direct connection to the signaling network.

B) the functions for linking to the signaling network, the basic SIBs and all of the functions which serve for billing, charge recording, statistics or fulfilling legal conditions remain on the central systems. These systems have a direct connection to the signaling network. Moreover, the central systems still obtain specific security modules which, inter alia, control the communication with respect to the distributed applications and monitor the other settings for the distributed application.

I claim:

1. A method for the secured provision of functions of a signaling network for distributed telecommunication applications, which comprises:

a) implementing or providing an application logic on a decentralized apparatus of a communication network;

b) setting up or utilizing functions on a central apparatus for linking to a signaling network;

c) setting up or utilizing security functions on a central apparatus for protecting at least one of the signaling network and the central apparatus; and d) providing a communication device for communication between the central apparatus and the decentralized apparatus to enable centrally available functions on the central apparatus to be called from the application logic implemented in a decentralized manner on the decentralized apparatus.

2. The method according to claim 1, which further comprises setting up or utilizing service independent building blocks on the central apparatus.

3. The method according to claim 1, which further comprises setting up or utilizing security-critical functions on the central apparatus.

4. The method according to claim 3, which further comprises selecting the security-critical functions from the group consisting of functions for billing, functions for charge recording, functions for statistics and functions for fulfilling legal conditions.

* * * * *

UNITED STATES PATENT AND TRADEMARK OFFICE
CERTIFICATE OF CORRECTION

PATENT NO. : 6,687,367 B1
DATED : February 3, 2004
INVENTOR(S) : Werner Dittmann It is certified that error appears in the above-identified patent and that said Letters Patent is hereby corrected as shown below:

<u>Title page,</u>
Item [30], Foreign Application Priority Data, should read as follows:
-- Feb. 13, 1998      [DE]           ……….. 198 05 943 --

Signed and Sealed this

Twenty-third Day of March, 2004

JON W. DUDAS
*Acting Director of the United States Patent and Trademark Office*